United States Patent
Nakagawa

(10) Patent No.: US 12,157,229 B2
(45) Date of Patent: Dec. 3, 2024

(54) WORK PROGRAM PRODUCTION SYSTEM AND WORK PROGRAM PRODUCTION METHOD

(71) Applicant: DAIHEN Corporation, Osaka (JP)

(72) Inventor: Shinichiro Nakagawa, Osaka (JP)

(73) Assignee: DAIHEN Corporation, Osaka (JP)

( * ) Notice: Subject to any disclaimer, the term of this patent is extended or adjusted under 35 U.S.C. 154(b) by 223 days.

(21) Appl. No.: 17/900,487

(22) Filed: Aug. 31, 2022

(65) Prior Publication Data
US 2023/0098696 A1 Mar. 30, 2023

(30) Foreign Application Priority Data

Sep. 24, 2021 (JP) .................................. 2021-155239
Jul. 7, 2022 (JP) .................................. 2022-109756

(51) Int. Cl.
*B25J 9/00* (2006.01)
*B25J 9/16* (2006.01)
*G06T 7/73* (2017.01)

(52) U.S. Cl.
CPC ........... *B25J 9/1666* (2013.01); *B25J 9/1692* (2013.01); *G06T 7/73* (2017.01); *G06T 2207/30108* (2013.01); *G06T 2207/30204* (2013.01)

(58) Field of Classification Search
CPC ...................... B25J 9/1664; G06T 2207/30204
See application file for complete search history.

(56) References Cited

U.S. PATENT DOCUMENTS

| | | |
|---|---|---|
| 2010/0152870 A1 | 6/2010 | Wanner et al. |
| 2019/0077016 A1* | 3/2019 | Atohira ................. G05B 19/182 |
| 2020/0009724 A1 | 1/2020 | Inoue |
| 2020/0070281 A1* | 3/2020 | Takeda ............... B23K 26/0884 |
| 2021/0016440 A1* | 1/2021 | Cassidy, II ............. B25J 9/1664 |
| 2022/0410394 A1* | 12/2022 | Leong ...................... G06T 7/70 |

FOREIGN PATENT DOCUMENTS

| | | |
|---|---|---|
| CN | 111687515 | 9/2020 |
| JP | H 11239989 | 9/1999 |
| JP | 2016197393 | 11/2016 |
| JP | 6816068 | 12/2020 |
| WO | WO 2020/136563 | 7/2020 |

* cited by examiner

*Primary Examiner* — Truc M Do
(74) *Attorney, Agent, or Firm* — Sterne, Kessler, Goldstein & Fox P.L.L.C.

(57) ABSTRACT

A work program production system includes a photographing unit that photographs an image including an object to be welded, a coordinate system setting unit that sets a user coordinate system based on a marker included in the image photographed by the photographing unit, a point-group-data plotting unit that detects a specific position of the marker on the basis of the image, sets the detected specific position on point group data acquired by a distance measurement sensor that measures a distance to the object to be welded, and plots, in the user coordinate system, the point group data to which coordinates in the user coordinate system using the set specific position as an origin are given, and a program production unit that produces a welding program.

11 Claims, 10 Drawing Sheets

WORK PROGRAM PRODUCTION SYSTEM AND WORK PROGRAM PRODUCTION METHOD

BACKGROUND

Field

The present invention relates to a work program production system and a work program production method.

Description of Related Art

Japanese Patent No. 6816068 discloses a technology of generating a program for a welding robot. In this technology, a user is allowed to select a typical layout pattern for a robot system and layout elements (such as a robot, a peripheral device, a table, and a work) to be laid out in the layout pattern, a layout in which the layout elements do not interfere with each other is generated on the basis of the selected layout pattern and layout elements, and the program for the welding robot is generated according to the layout. In addition, in this technology, the generated program is executed in a virtual space and, when the robot in an operating state interferes with another of the layout elements, positions at which the layout elements are to be disposed are automatically corrected, and the program is corrected on the basis of the automatically corrected positions at which the layout elements are to be disposed.

SUMMARY

In the technology described above, it is necessary to prepare the layout pattern and layout elements to be selected in advance. Accordingly, when a layout pattern different from the layout pattern prepared in advance is to be used or when a layout element not included in the layout elements prepared in advance is to be used, a correct program cannot be generated unless preparations are made to allow the layout pattern and the layout element to be selected.

It is therefore an object of the present invention to provide a work program production system and a work program production method which allow flexible handling of various layout patterns and layout elements.

A work program production system according to an aspect of the present invention includes: a photographing terminal that photographs an image including an object to be worked; a coordinate system setting unit that sets a user coordinate system based on a marker included in the image photographed by the photographing terminal; a point-group-data plotting unit that detects a specific position of the marker on the basis of the image, sets the detected specific position on point group data acquired by a distance measurement sensor that measures a distance to the object to be worked, and plots, in the user coordinate system, the point group data to which coordinates in the user coordinate system using the set specific position as an origin are given; and a program production unit that produces a work program so as to allow an industrial robot virtually placed in the user coordinate system to perform work on the basis of the point group data plotted in the user coordinate system, while avoiding interference with the point group data.

According to this aspect, it is possible to produce the work program such that the specific position of the marker is detected on the basis of the image obtained by photographing the object to be worked and the marker, the detected specific position of the marker is set on the point group data, the point group data to which the coordinates in the user coordinate system using the set specific position of the marker as the origin are given is plotted on the image, and the industrial robot virtually placed in the user coordinate system performs the work, while avoiding the interference with the point group data. Therefore, it is possible to cause the industrial robot to perform the work, while avoiding the interference, irrespective of a state in which the object to be worked is disposed or a situation of an obstacle.

In the above aspect, it may be possible that, when determining that the industrial robot interferes with the point group data, the program production unit assumes that, of areas formed on both sides of the point group data determined to interfere with the industrial robot and serving as a boundary, the area on a side on which the photographing terminal is present is an interference avoidance area, and changes a part of an operation trajectory of the industrial robot in the interference avoidance area to allow the industrial robot to avoid the interference with the point group data determined to interfere with the industrial robot.

According to this aspect, when it is determined that the industrial robot interferes with the point group data, it is possible to change the part of the operation trajectory of the industrial robot in the interference avoidance area located on a front side of the point group data and allow the industrial robot to avoid the interference.

In the above aspect, it may be possible that a direction which allows the industrial robot to avoid the point group data determined to interfere with the industrial robot is a direction which brings the industrial robot further away from the point group data determined to interfere with the industrial robot and closer to the photographing terminal in the interference avoidance area.

According to this aspect, it is possible to move the industrial robot away from the interference into the direction which brings the industrial robot closer to the photographing terminal, and thereby move the industrial robot away from the interference into a direction which increases reliability of the point group data.

In the above aspect, it may be possible that the work program production system further includes: a detection unit that detects a portion to be worked of the object to be worked on the basis of the point group data plotted in the user coordinate system, and the program production unit produces a work program so as to allow the industrial robot to perform the work on the portion to be worked that is detected by the detection unit, while avoiding the interference with the point group data.

According to this aspect, it is possible to produce the work program such that the portion to be worked is recognized on the basis of the point group data plotted in the user coordinate system, and the industrial robot performs the work on the recognized portion to be worked, while avoiding the interference with the point group data. Therefore, it is possible to improve accuracy of the work based on the work program.

In the above aspect, it may be possible that the photographing terminal is provided in plurality, and the individual photographing terminals photograph images from different positions.

According to this aspect, it is possible to determine the presence or absence of the interference for each of positions at which the photographing was performed, and make an adjustment such that, when it is determined that there is the interference, the interference is avoided.

In the above aspect, it may be possible that the work program production system further includes: a setting unit that sets a set of the point group data to be removed from a target of interference avoidance.

According to this aspect, it is possible to allow the work to proceed without performing an avoidance operation with respect the interference that does not interrupt the work.

A work program production method according to another aspect of the present invention is a method to be implemented by a processor, the method including the steps of: setting a user coordinate system based on a marker included in an image including an object to be worked and photographed by a photographing terminal; detecting a specific position of the marker on the basis of the image, setting the detected specific position on point group data acquired by a distance measurement sensor that measures a distance to the object to be worked, and plotting, in the user coordinate system, the point group data to which coordinates in the user coordinate system using the set specific position as an origin are given; and producing a work program so as to allow an industrial robot virtually placed in the user coordinate system to perform work on the basis of the point group data plotted in the user coordinate system, while avoiding interference with the point group data.

According to this aspect, it is possible to produce the work program such that the specific position of the marker is detected on the basis of the image obtained by photographing the object to be worked and the marker, the detected specific position of the marker is set on the point group data, the point group data to which the coordinates in the user coordinate system using the set specific position of the marker as the origin are given is plotted on the image, and the industrial robot virtually placed in the user coordinate system performs the work, while avoiding the interference with the point group data. Therefore, it is possible to cause the industrial robot to perform the work, while avoiding the interference, irrespective of a state in which the object to be worked is disposed or a situation of an obstacle.

According to the present invention, it is possible to provide a work program production system and a work program production method which allow flexible handling of various layout patterns and layout elements.

DETAILED DESCRIPTION

Referring to the accompanying drawings, a description will be given of a preferred embodiment of the present invention. Note that, throughout the individual drawings, components denoted by the same reference signs have the same or similar configurations. In addition, since the drawings are schematic, dimensions or ratios of the individual components are different from those of real components.

Figure 1:
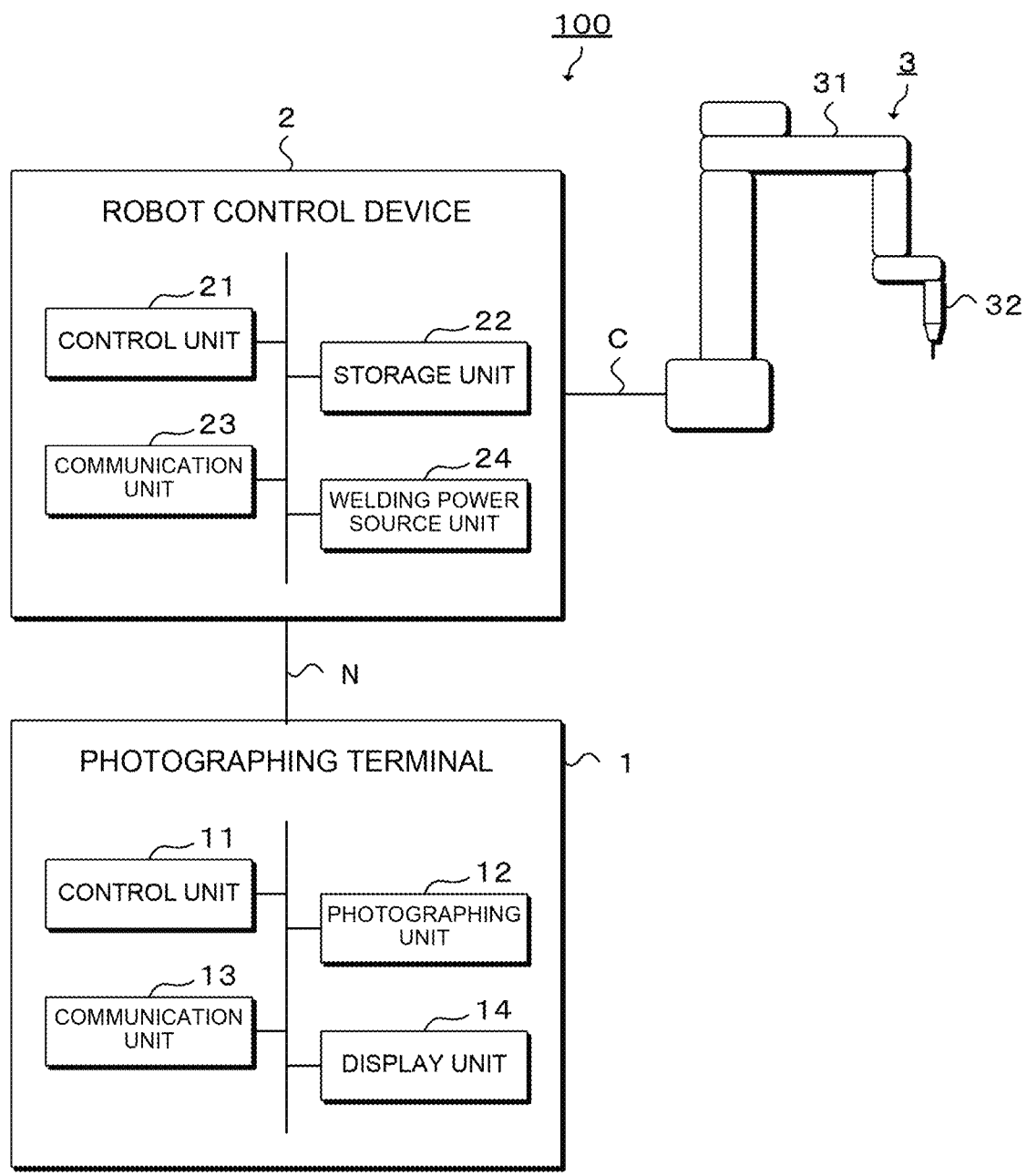
FIG. 1 is a diagram illustrating an example of a configuration of a welding robot system including a welding program production system according to an embodiment.

FIG. 1 is a diagram illustrating an example of a configuration of a welding robot system including a welding program production system according to the embodiment. A welding robot system 100 includes, e.g., a photographing terminal 1, a robot control device 2, and a manipulator 3. The photographing terminal 1 and the robot control device 2 are connected via, e.g., a network N, while the robot control device 2 and the manipulator 3 are connected via, e.g., a communication cable C. The network N may be either wired (including the communication cable) or wireless. Note that the welding robot system 100 may also include a teaching pendant. The teaching pendant is an operating device to be used by a worker to teach an operation to be performed by the manipulator 3.

The manipulator 3 is a welding robot that performs arc welding according to execution conditions set in the robot control device 2. The manipulator 3 includes, e.g., a multi-junction arm 31 provided on a base member fixed to a floor surface or the like in a factory and a welding torch 32 connected to a leading end of the multi-junction arm 31. It is assumed herein that a welding wire to be supplied to a welding torch 32 is not included in a configuration of the manipulator 3.

The robot control device 2 is a control unit that controls an operation of the manipulator 3 and includes, e.g., a control unit 21, a storage unit 22, a communication unit 23, and a welding power source unit 24.

The control unit 21 controls the manipulator 3 and the welding power source unit 24 through, e.g., execution of a work program stored in the storage unit 22 by a processor.

The communication unit 23 controls communication with the photographing terminal 1 connected thereto via the network N and controls communication with the manipulator 3 connected thereto via the communication cable C.

The welding power source unit 24 supplies, according to welding execution conditions determined in advance, a welding current, a welding voltage, and the like to the manipulator 3 so as to, e.g., generate an arc between a leading end of the welding wire and a work. Examples of the welding execution conditions include data items such as welding conditions, a welding starting position, a welding ending position, an arc discharge period, a welding distance, a posture of the welding torch, and a moving speed of the welding torch. The welding power source unit 24 may also be provided separately from the robot control device 2.

The photographing terminal 1 is, e.g., a digital camera, but may also be a portable terminal with a digital camera. Examples of the portable terminal include transportable terminals such as a tablet terminal, a smartphone, a personal data assistant (PDA), and a notebook PC (personal computer). The photographing terminal 1 includes, e.g., a control unit 11, a photographing unit 12, a communication unit 13, and a display unit 14.

The control unit 11 controls each of the components of the photographing terminal 1 through execution of a predetermined program stored in a memory by the processor.

The photographing unit 12 includes, e.g., a lens and an image capturing element (image sensor) and converts light from a photographed object that has been received by the lens to an electric signal (digital image data).

The communication unit 13 controls communication with the robot control device 2 connected thereto via the network N.

The display unit 14 is, e.g., a display having a touch panel, and displays a screen image of the object photographed by the photographing unit 12, while receiving an input of an operation instruction from the worker or the like. The display unit 14 may also be provided as, e.g., a display device having a touch panel separately from the photographing terminal 1.

Figure 2:
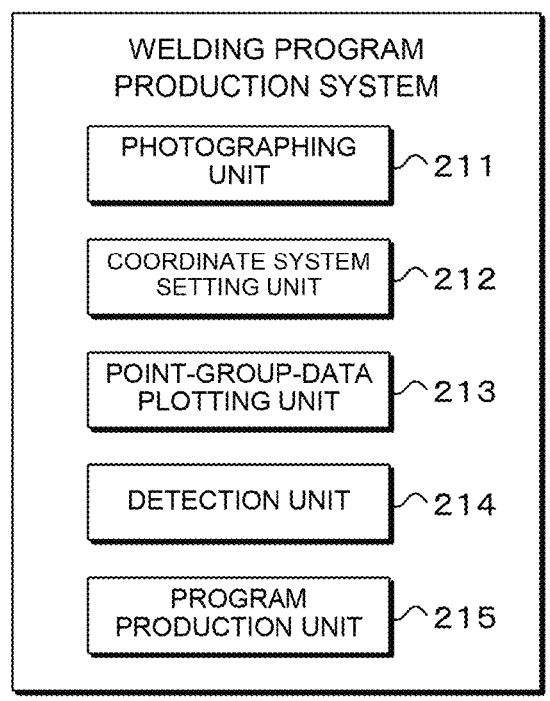
FIG. 2 is a diagram illustrating an example of a functional configuration of the welding program production system.

FIG. 2 is a diagram illustrating an example of a functional configuration of the welding program production system according to the present invention. For example, the welding program production system includes, as the functional configuration, a photographing unit 211, a coordinate system setting unit 212, a point-group-data plotting unit 213, a detection unit 214, and a program production unit 215. Among these functions, the photographing unit 211 is the function included in the photographing terminal 1. Meanwhile, all of the coordinate system setting unit 212, the point-group-data plotting unit 213, the detection unit 214, and the program production unit 215 may be included in either of the photographing terminal 1 and the robot control device 2, or the individual functions may also be distributed to the photographing terminal 1 and the robot control device 2 to be included therein. Alternatively, another device other than the photographing terminal 1 and the robot control device 2 may also include any or all of the functions described above.

Figure 3:
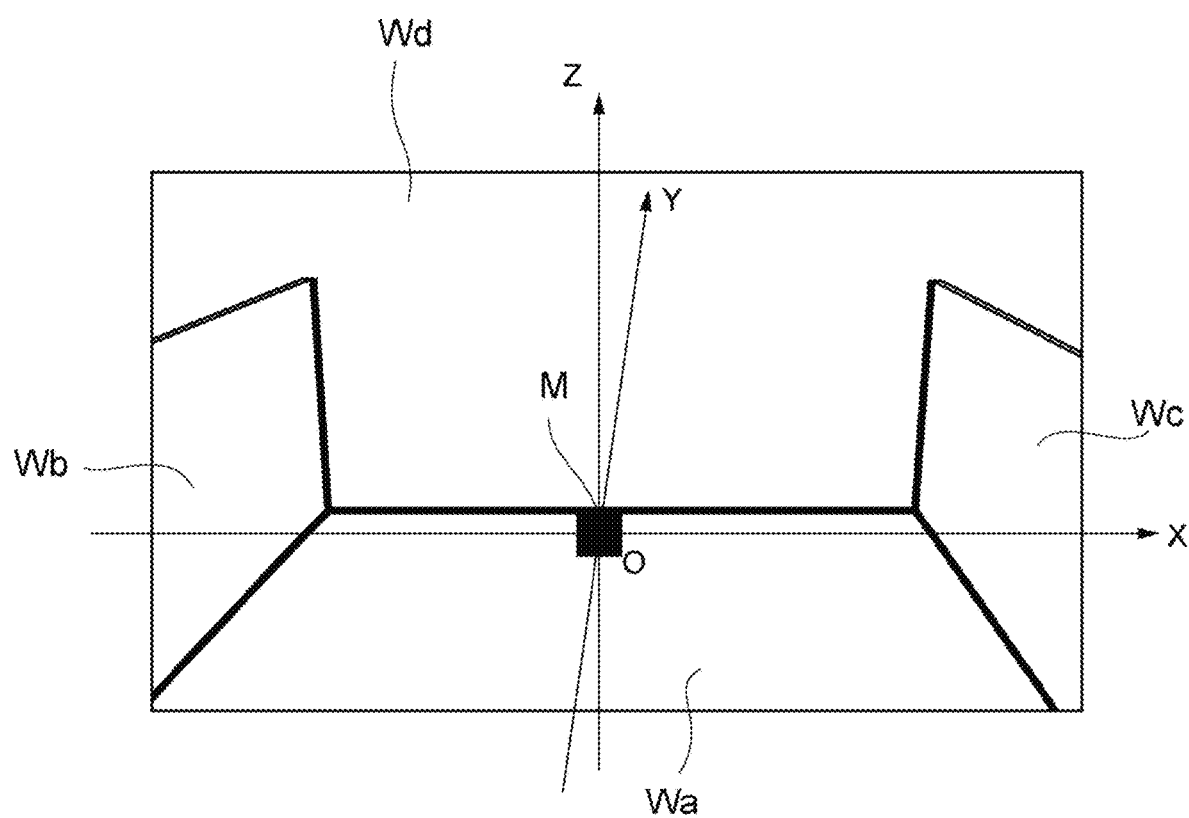
FIG. 3 is a diagram illustrating an example of a user coordinate system using a position of a marker as an origin.

The photographing unit 211 is the same as the photographing unit 12 of the photographing terminal 1 described above. The photographing unit 211 according to the present embodiment photographs, as an object to be welded, a structure including, e.g., a plurality of iron plate members (works) each serving as an object to be arc-welded. FIG. 3 illustrates an example of the object to be welded. In FIG. 3, the structure including one work Wa serving as a bottom plate, two works Wb and Wc serving as side plates, and one work Wd serving as a rear plate is illustrated as the object to be welded. In a space formed by this structure, a marker M is placed.

The coordinate system setting unit 212 illustrated in FIG. 2 sets a user coordinate system using, as an origin, a position of the marker M included in the screen image photographed by the photographing unit 211. FIG. 3 illustrates an example of the user coordinate system using the position of the marker M as the origin. In FIG. 3, a three-dimensional orthogonal coordinate system using the position of the marker M as an origin O and including an X-axis, a Y-axis, and a Z-axis which are perpendicular to each other at the origin O is illustrated as the user coordinate system.

Note that the origin of the user coordinate system may appropriately be set on the basis of the marker (such as, e.g., a corner of the marker or a center of the marker). The following is a reason for setting the origin of the user coordinate system on the basis of the marker instead of setting the origin of the user coordinate system on the basis of the photographing terminal 1. During photographing, the photographing terminal 1 is carried by the worker to move, and consequently it is difficult to specify a position of the photographing terminal 1 in a robot coordinate system. By contrast, the marker is fixedly disposed, and consequently it is relatively easy to specify the position of the marker in the robot coordinate system. As a result, when the user coordinate system is set on the basis of the marker, it is possible to more easily calibrate a positional relationship between the user coordinate system and the robot coordinate system than when the user coordinate system is set on the basis of the photographing terminal 1.

It is to be noted herein that the marker M may appropriately be an identifier capable of causing the photographing unit 211 to recognize that the marker M is placed in the space but, preferably, an AR marker is used. By using the AR marker, when the AR marker placed in the space is recognized, the user coordinate system using the AR marker as the origin can easily be displayed in superimposed relation on a real screen image.

The user coordinate system based on the marker can be set by moving the origin of the camera coordinate system (e.g., a center of the lens) to the specific position of the marker described later. Such a user coordinate system can be set by applying, e.g., a known technique of setting a coordinate system of the AR marker.

The point-group-data plotting unit 213 illustrated in FIG. 2 acquires coordinate data (point group data) corresponding to an object included in an image photographed by the photographing unit 211, and plots the acquired coordinate data in the user coordinate system.

A specific description is as follows. The point-group-data plotting unit 213 detects the specific position of the marker (e.g., the corner of the marker or the center of the marker) on the basis of the image photographed by the photographing unit 211, sets the detected specific position of the marker on the point group data acquired by a distance measurement sensor described later, and plots, in the user coordinate system, the point group data to which coordinates of the user coordinate system using, as the origin, the set specific position of the marker are given. The specific position of the marker to be set on the point group data may be specified such that, e.g., the specific position of the marker on the point group data is automatically recognized by data analysis or the worker points the specific position of the marker on the point group data.

The coordinate data corresponding to the object can be acquired by, e.g., the distance measurement sensor. The distance measurement sensor may appropriately be a sensor capable of measuring a distance to the object to be welded. As the distance measurement sensor, e.g., a LiDAR (Light Detection and Ranging) sensor, a millimeter wave sensor, an ultrasonic wave sensor, or the like can be used. Alternatively, the coordinate data corresponding to the object may also be acquired by being arithmetically determined on the basis of a plurality of images obtained by photographing the object to be welded at a plurality of different positions. In this case, it is possible to use a three-dimensional measurement method based on a known stereo method.

It is to be noted herein that the distance measurement sensor may also be included in the photographing terminal 1. This allows a positional relationship between the image sensor and the distance measurement sensor to be fixed and allows the individual sensors to acquire data with the same timing. As a result, it is possible to improve efficiency of processing of setting the specific position of the marker descried above on the point group data. In addition, by providing the photographing terminal 1 with the image sensor and the distance measurement sensor, it becomes possible to allow the worker who operates the photographing terminal 1 to freely move to any position at which a welding line of the object to be welded and the marker can simultaneously be photographed and perform the photographing, which can increase work efficiency.

Furthermore, a sensor having a function of a sensor that photographs an image to acquire the image and a function of a sensor that measures a distance to acquire the distance may also be included in the photographing terminal 1. This allows an image including the object to be welded and a distance to the object to be welded to be obtained from the same place with the same timing, and therefore it is possible to further increase the efficiency of the processing of setting the specific position of the marker described above on the point group data.

Figure 4:
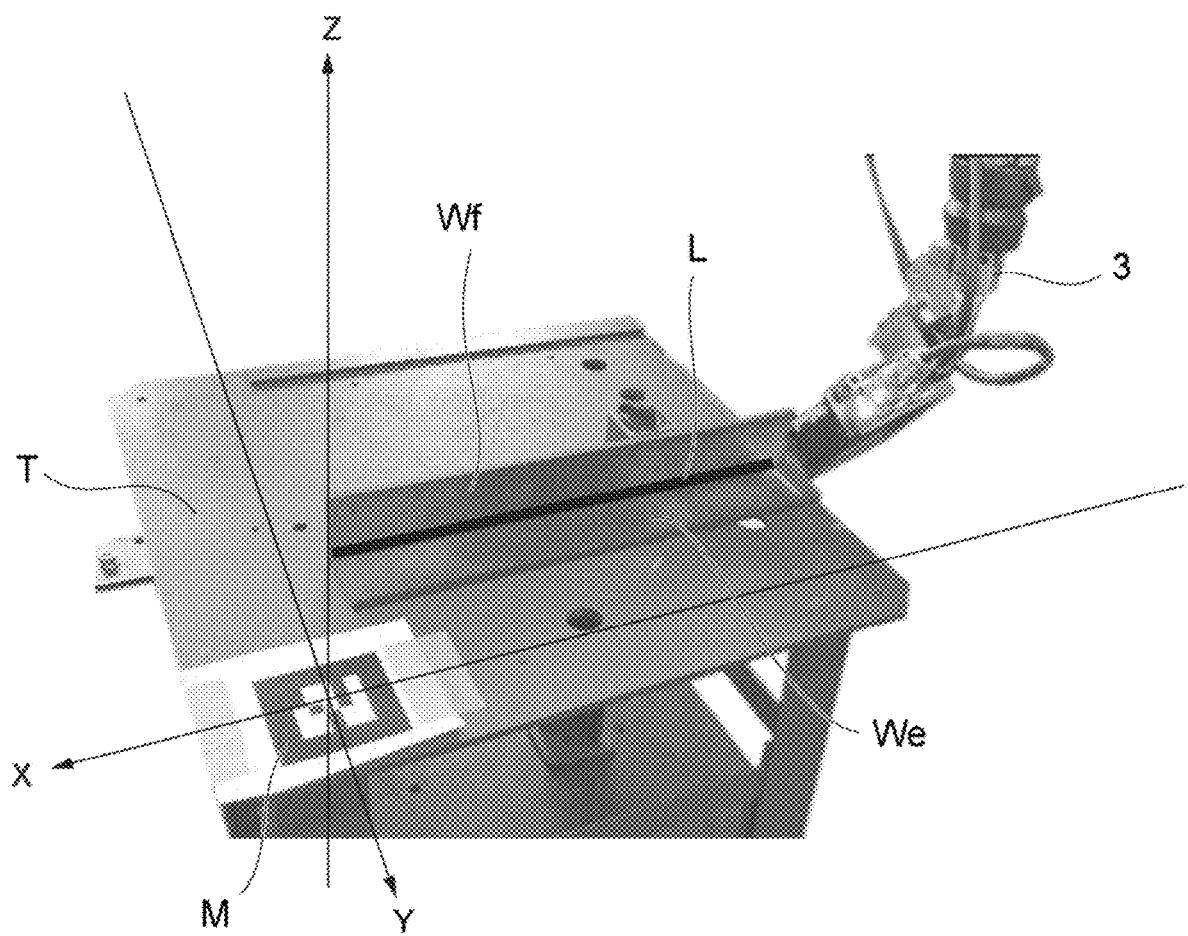
FIG. 4 is a diagram illustrating an example of an object to be welded.
Figure 5:
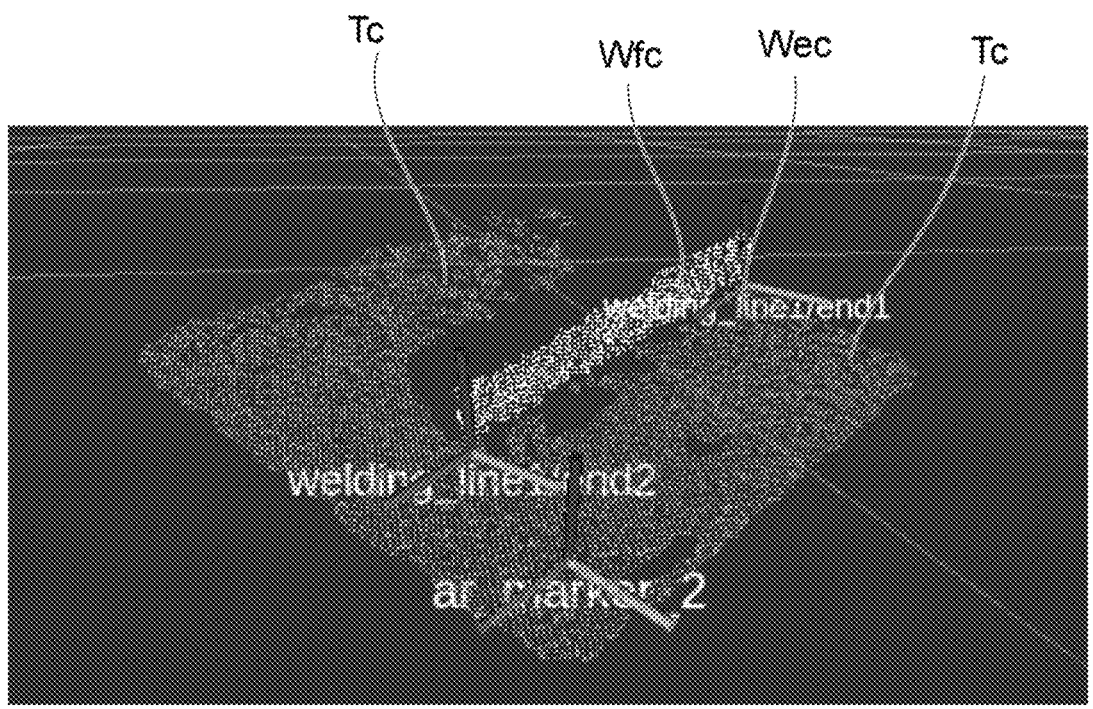
FIG. 5 is a diagram illustrating an example of point group data to be plotted in the user coordinate system.

Referring to FIGS. 4 and 5, a description will be given of a concept of plotting, in the user coordinate system, the coordinate data corresponding to the object included in the image as the point group data.

FIG. 4 is a diagram illustrating an example of the object to be welded. In FIG. 4, the object to be welded that includes a work We placed on a work table T and a work Wf placed so as to have a substantially perpendicular relationship with the work We is illustrated by way of example. In the vicinity of the object to be welded, the marker M is placed.

FIG. 5 is a diagram illustrating an example of the point group data to be plotted in the user coordinate system. In FIG. 5, coordinate data Wec and coordinate data Wfc respectively corresponding to the work We and the work Wf in FIG. 4 and coordinate data Tc corresponding to the work table T in FIG. 4 are plotted as the point group data in the user coordinate system.

The detection unit 214 illustrated in FIG. 2 detects the welding line of the object to be welded on the basis of the point group data plotted in the user coordinate system. Specifically, the detection unit 214 recognizes a plurality of planes corresponding to the object to be welded on the basis of the point group data plotted in the user coordinate system. The detection unit 214 detects, as the welding line, a line of intersection between the two planes included in the plurality of planes. When there are a plurality of combinations of the two planes, the welding line is detected for each of the combinations.

It is to be noted herein that what is to be detected as the welding line is not limited to the line of intersection between the two planes. For example, it may also be possible to detect, as the welding line, a line of intersection between two surfaces.

Figure 6:
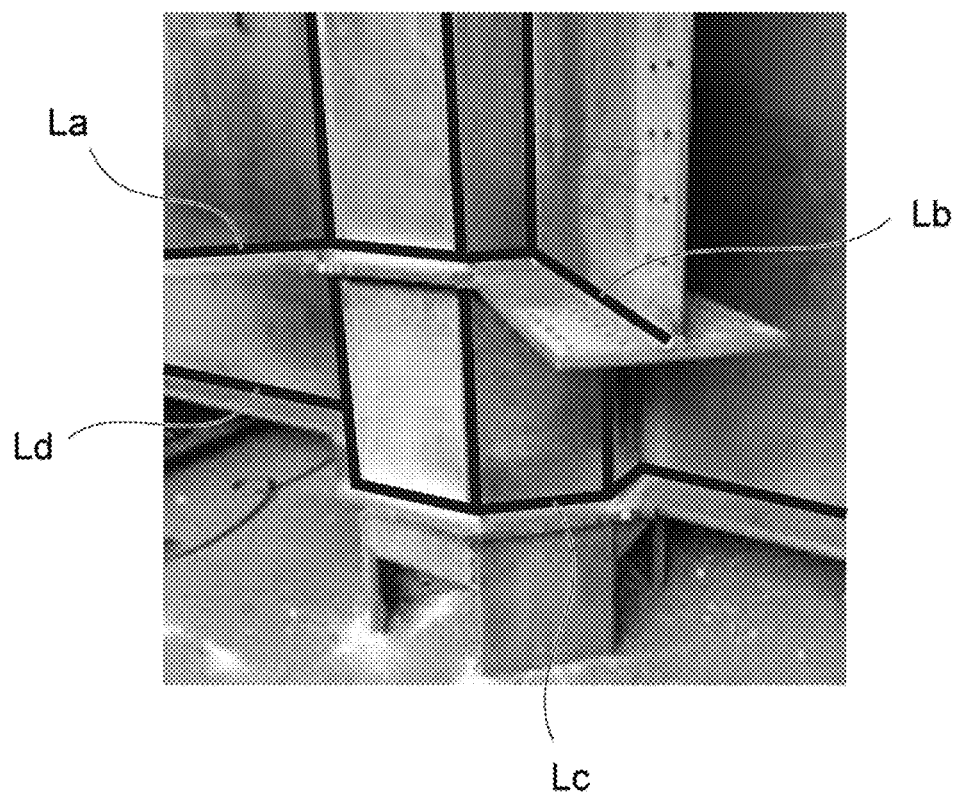
FIG. 6 is a diagram illustrating an example of the object to be welded.

Note that it may also be possible for the worker to selectively determine whether or not the detected welding line is the welding line along which welding is to be actually performed on the image by following guidance such as, e.g., a voice/sound or a text message and leave only the welding lines along which welding is to be actually performed. Referring to FIG. 6, a description will be given of an example of a method of leaving only the welding lines along which welding is to be actually performed.

In FIG. 6, the plurality of welding lines detected by the detection unit 214 are shown in overlapping relation on an image of the object to be welded. It is assumed that, among the plurality of welding lines, the welding lines along which welding is to be actually performed are, e.g., four welding lines La, Lb, Lc, and Ld. In this case, when the worker sequentially touches (taps on) the lines not corresponding to the actual welding lines among the plurality of welding lines displayed on the image by following guidance such as, e.g., a voice/sound or a text message, the touched welding lines are removed from over the image. Thus, it is possible to leave, on the image, only the welding lines La, Lb, Lc, and Ld along which welding is to be actually performed. Alternatively, it may also be possible for the worker to specify a range on the image with a circle or the like and leave only the welding lines within the specified range.

The program production unit 215 produces a welding program to perform the arc welding on the basis of the point group data plotted in the user coordinate system such that the manipulator 3 virtually placed in the user coordinate system performs a welding operation, while avoiding interference with the point group data. It is assumed herein that interference in the present embodiment means that, when the manipulator 3 performs the welding operation, the welding operation is interrupted by contact with the objects corresponding to the point group data or the like (a problem occurs in a normal welding operation).

A position at which the manipulator 3 is to be virtually placed can freely be specified by the worker through touching or the like of the image of the object to be welded by following guidance such as, e.g., a voice/sound or a text message.

Alternatively, the manipulator 3 to be virtually placed may also be, e.g., a model to which accessory parts such as a wire feeding device, various sensors, and a welding torch are connected.

Specifically, the program production unit 215 produces the welding program such that the manipulator 3 virtually placed in the user coordinate system avoids interference with the point group data plotted in the user coordinate system, and follows the welding lines detected by the detection unit 214. A description will be given of an example of a procedure of producing the welding program with reference to FIG. 7.

Figure 7:
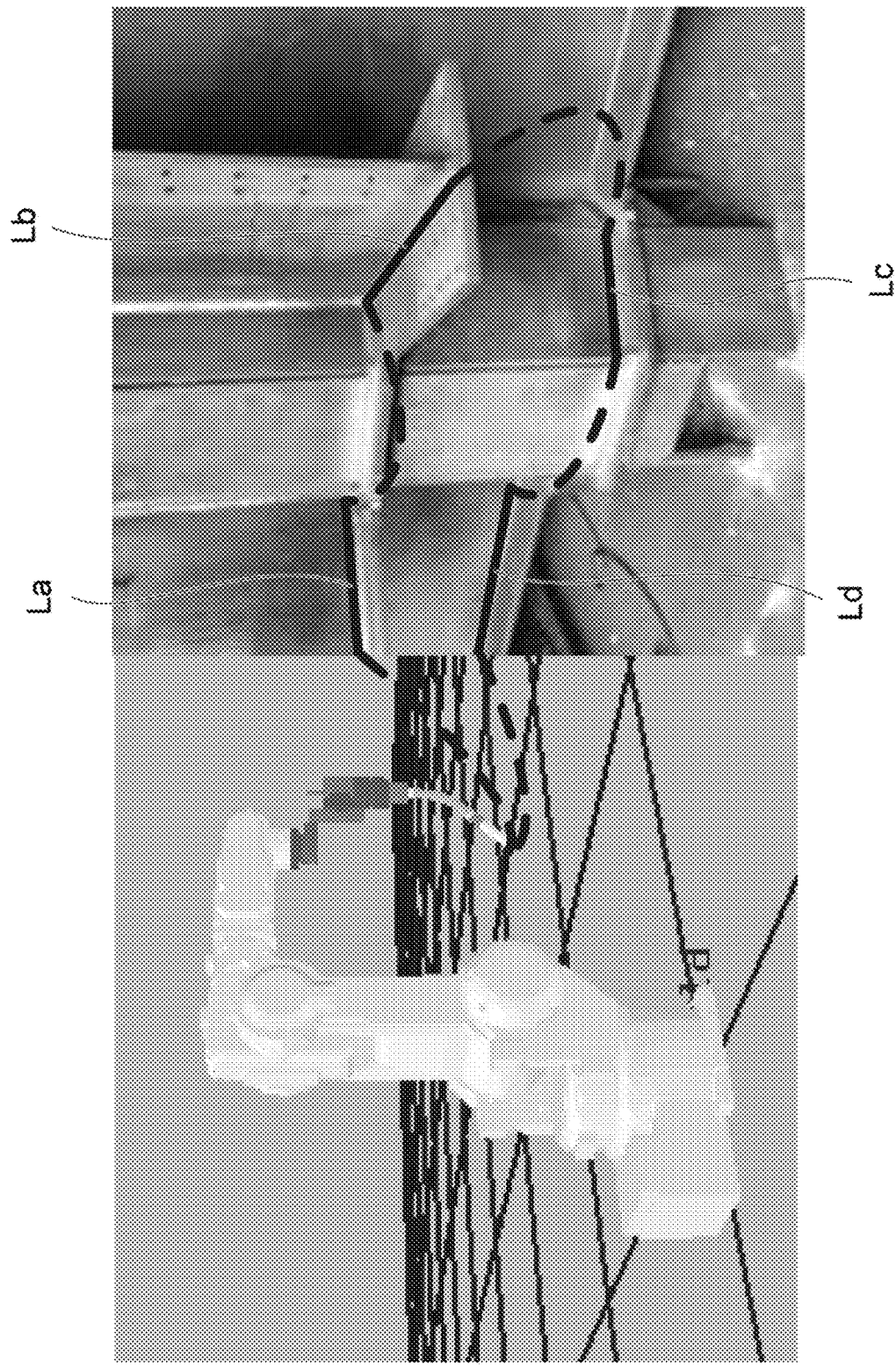
FIG. 7 is a diagram for illustrating an example of a procedure of preparing a welding program.

In FIG. 7, as the welding lines along which welding is to be actually performed, the four welding lines La, Lb, Lc, and Ld are illustrated in superimposed relation on the image of the object to be welded. An order in which welding is to be performed along the four welding lines La, Lb, Lc, and Ld and welding directions may be set by being specified by the worker on a screen or may also be determined by the program production unit 215 by arithmetically determining, e.g., a path having a shortest distance. In this example, it is assumed that welding is performed along the welding line La, the welding line Lb, the welding line Lc, and the welding line Ld in this order, and settings are made such that the welding along each of the welding lines La and Lb is performed in a rightward direction on the paper sheet with the figure, while the welding along each of the welding lines Lc and Ld is performed in a leftward direction on the paper sheet with the figure.

First, the program production unit 215 produces a program to move the welding torch 32 from a reference position of the manipulator 3 to a welding starting position for the welding line La. Subsequently, the program production unit 215 produces a program to start the arc welding at the welding starting position for the welding line La, move the welding torch 32 so as to follow the welding lines La, while performing the arc welding, and end the arc welding at a welding ending position for the welding line La.

Subsequently, the program production unit 215 produces a program to move the welding torch 32 from the welding ending position for the welding line La to a welding starting position for the welding line Lb. At this time, a movement path (operation trajectory) of the welding torch 32 is adjusted to allow the welding torch 32 to move through a path not interfering with the point group data. The adjustment can be made by, e.g., determining whether or not the welding torch 32 interferes with the point group data and changing the movement path of the welding torch 32 into a direction which allows the interference to be avoided when the welding torch 32 interferes with the point group data. A method of recognizing the direction which allows the interference with the point group data to be avoided will be described later.

Subsequently, the program production unit 215 produces a program to start the arc welding at the welding starting position for the welding line Lb, move the welding torch 32 such that the welding torch 32 follows the welding line Lb, while performing the arc welding, and end the arc welding at a welding ending position for the welding line Lb. Subsequently, the program production unit 215 produces a program to move the welding torch 32 from the welding ending position for the welding line Lb to a welding starting position for the welding line Lc, while adjusting the movement path.

Subsequently, the program production unit 215 produces a program to start the arc welding at the welding starting position for the welding line Lc, move the welding torch 32 such that the welding torch 32 follows the welding line Lc, while performing the arc welding, and end the arc welding at a welding ending position for the welding line Lc. Subsequently, the program production unit 215 produces a program to move the welding torch 32 from the welding ending position for the welding line Lc to a welding starting position for the welding line Ld, while adjusting the movement path.

Subsequently, the program production unit 215 produces a program to start the arc welding at the welding starting position for the welding line Ld, move the welding torch 32 such that the welding torch 32 follows the welding line Ld, while performing the arch welding, and end the arc welding at a welding ending position for the welding line Ld. Subsequently, the program production unit 215 produces a program to move the welding torch 32 from the welding ending position for the welding line Ld to the reference position of the manipulator 3.

The program production unit 215 causes the storage unit 22 of the robot control device 2 to store the produced welding programs. Thus, when the manipulator 3 performs the arc welding, it is possible to cause the control unit 21 of the robot control device 2 to read the welding programs and control the manipulator 3 such that that the manipulator 3 performs the arc welding according to a welding procedure specified by the welding programs, while avoiding interference with the objects.

Figure 8:
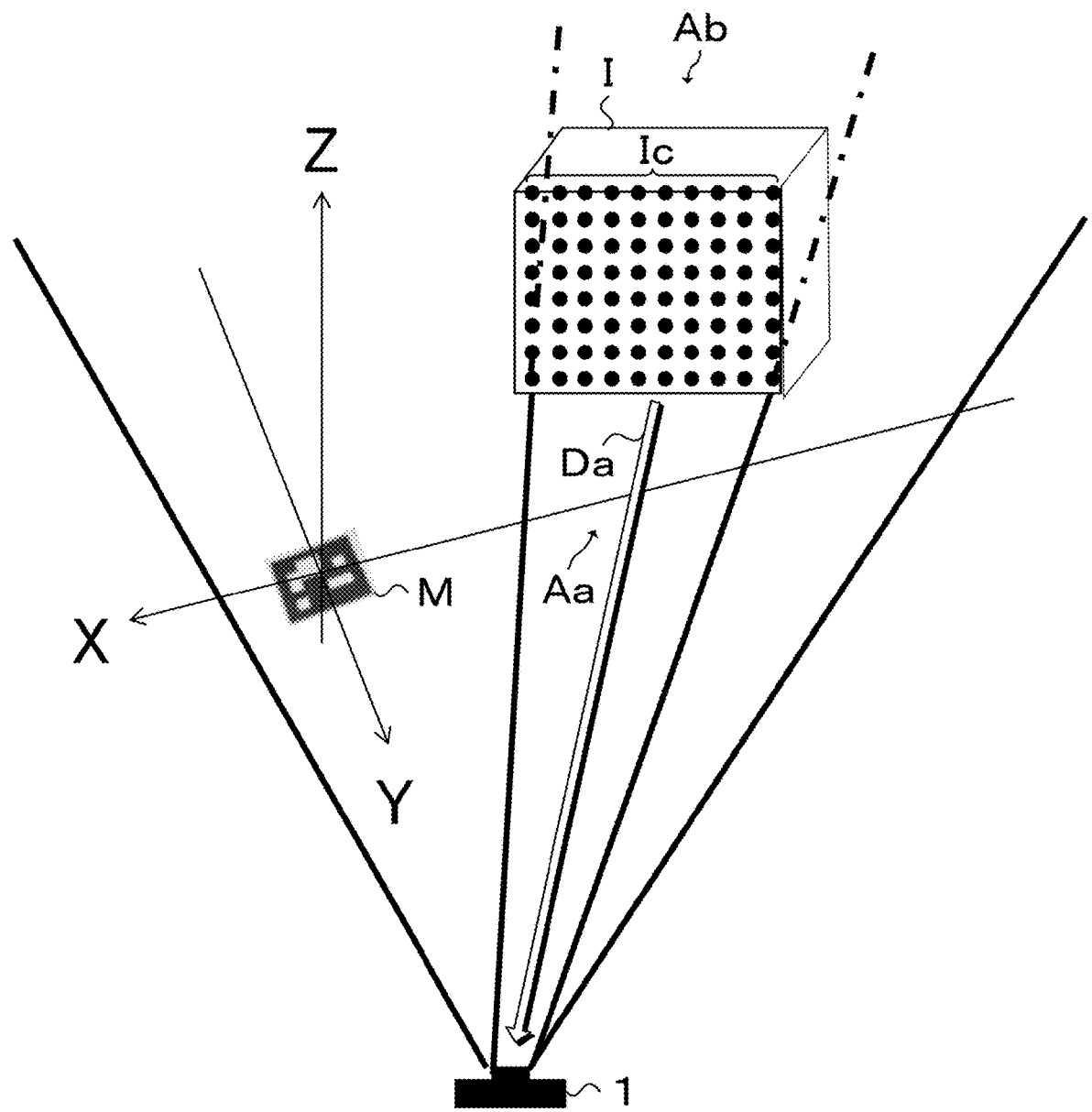
FIG. 8 is a schematic diagram illustrating an example of a method of recognizing a direction which allows interference with the point group data to be avoided.

Referring to FIG. 8, a description will be given of an example of a method in which the program production unit 215 recognizes the direction which allows the interference with the point group data to be avoided. FIG. 8 is a diagram schematically illustrating a state in which, in an image photographed by the photographing terminal 1 in which the distance measurement sensor is mounted, the marker M and an interfering object I (e.g., the object to be welded or another object) are included. The three-dimensional user coordinate system is set on the basis of the marker M and, on a side of the interfering object I with the photographing terminal 1, point group data Ic in the user coordinate system is plotted.

The point group data Ic is data to be acquired by the distance measurement sensor mounted in the photographing terminal 1. It follows therefore that, when the point group data Ic has been acquired by the photographing terminal 1, no obstacle is present between the photographing terminal 1 and the point group data Ic. In other words, a space formed between the photographing terminal 1 and the point group data Ic is a free space in which no obstacle is present.

The program production unit 215 determines that, of two areas formed on both sides of the point group data Ic serving as a boundary, the area on the side (front side) on which the photographing terminal 1 is present is an interference avoidance area Aa where the interfering object I is not present. Meanwhile, the program production unit 215 determines that, of the two areas formed on both sides of the point group data Ic serving as the boundary, the area on the side (rear side) on which the photographing terminal 1 is not present is an interference area Ab where the interfering object I is present.

Then, the program production unit 215 recognizes, in the interference avoidance area Aa, a direction Da extending from the point group data Ic to a reference point (e.g., the center of the lens) of the photographing terminal 1 as the direction which allows the interference with the point group data to be avoided.

Note that a distance which allows the interference with the point group data to be avoided may be, e.g., a fixed value specified by the worker, or may also be a lower limit value in a numerical value range obtained through machine learning of a result of simulation of an avoidance operation. The avoidance operation may be carried out by, e.g., moving the position of the manipulator 3, moving any of junctions of the multi-junction arm 31, or changing a posture of the welding torch 32, or may also be a combination thereof.

Note that accuracy of the point group data tends to decrease with increasing distance of the target object from the photographing position. Accordingly, as the distance between the photographing position and the interfering object is larger, the distance which allows the interference with the point group data to be avoided may also be increased.

In the description of FIG. 8 given above, in the interference avoidance area Aa, a part of the operation trajectory of the manipulator 3 is changed into the direction Da extending from the point group data Ic to the reference point of the photographing terminal 1, but the direction into which the part of the operation trajectory of the manipulator 3 is to be changed is not limited thereto. For example, in the interference avoidance area Aa, the part of the operation trajectory of the manipulator 3 may also be changed into a direction which brings the manipulator 3 further away from the point group data Ic and closer to the photographing terminal 1 or, alternatively, in the interference avoidance area Aa, the part of the operation trajectory of the manipulator 3 may also be changed so as to allow the interference with the point group data to be avoided. By changing the operation trajectory of the manipulator 3 in the direction which brings the manipulator 3 closer to the photographing terminal 1, it is possible to move the manipulator 3 away from the interference into the direction which increases reliability of the point group data and increase avoidance accuracy.

Figure 9:
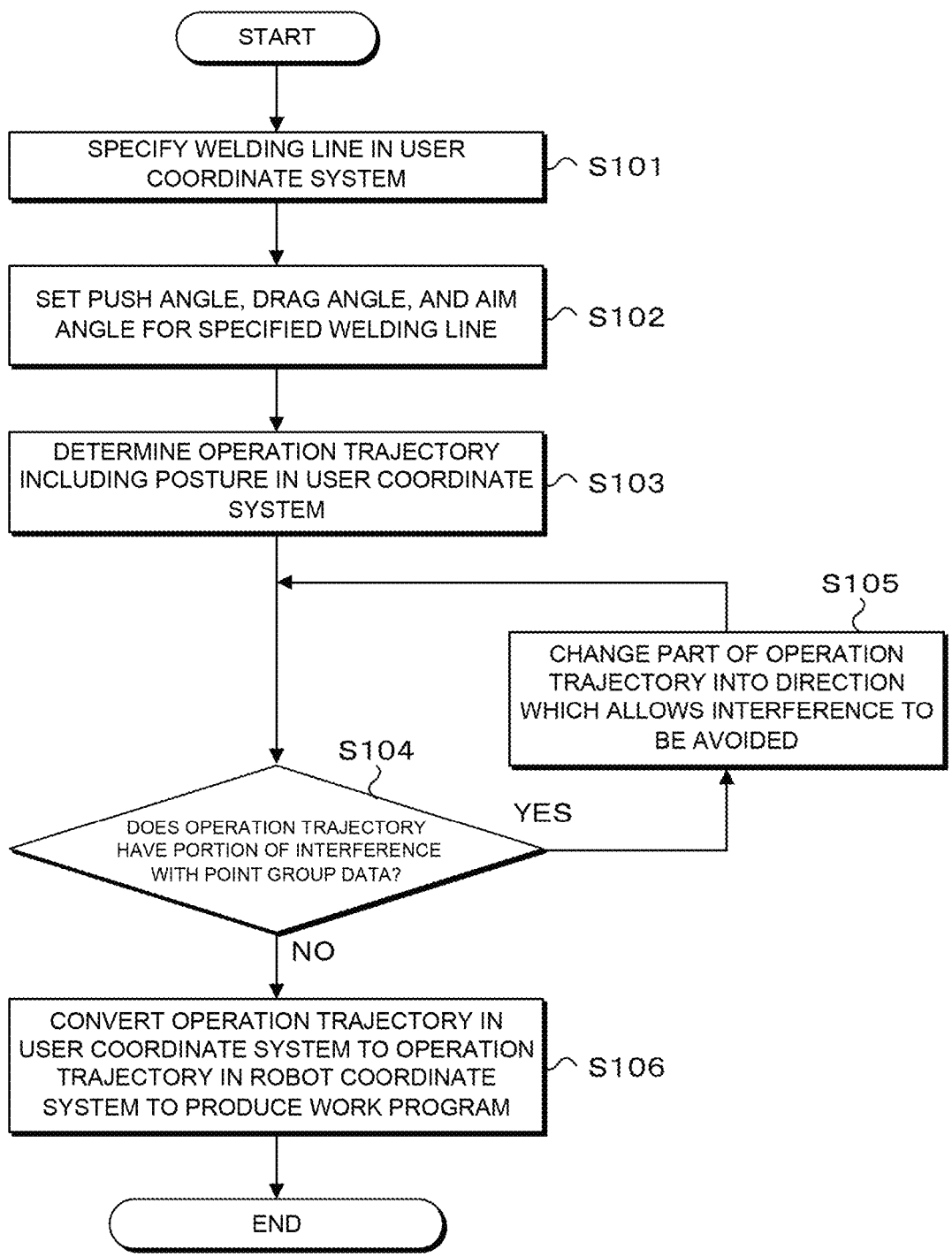
FIG. 9 is a flow chart for illustrating an example of an operation when the welding program is to be produced in the welding program production system.

Referring to FIG. 9, an example of an operation when the program production unit 215 produces the welding programs will be described.

First, the program production unit 215 specifies a welding line in the user coordinate system on the basis of welding lines detected by the detection unit 214 (Step S101).

Subsequently, the program production unit 215 sets, for the welding line specified in Step S101 described above, the posture of the torch at a push angle of the torch, a drag angle of the torch, an aim angle of the torch, or the like is set (Step S102).

Subsequently, the program production unit 215 determines the operation trajectory including a posture of each of portions of the manipulator 3 in the user coordinate system (Step S103).

Subsequently, the program production unit 215 determines whether or not the operation trajectory in the user coordinate system has a portion in which the manipulator 3 interferes with the point group data (Step S104).

When it is determined in Step S104 described above that the operation trajectory has a portion in which the manipulator 3 interferes with the point group data (YES in Step S104), the program production unit 215 changes a part of the operation trajectory of the manipulator 3 into a direction which allows the interference with the point group data to be avoided (Step S105).

Meanwhile, when it is determined in Step S104 described above that the operation trajectory has no portion in which the manipulator 3 interferes with the point group data (NO in Step S104), the program production unit 215 converts the operation trajectory in the user coordinate system to an operation trajectory in the robot coordinate system to produce a welding program (Step S106). Then, the present operation is ended.

Each of the steps of the operation described above may be executed by either of the photographing terminal 1 and the robot control device 2, and it may be possible that some of the individual steps are executed by the photographing terminal 1, while some of the remaining steps are executed by the robot control device 2.

As described above, the welding program production system according to the embodiment allows the welding program to be produced such that the user coordinate system using, as the origin, the specific position of the marker placed in the space formed by the object to be welded is set on the basis of the image obtained by photographing the object to be welded and the marker, the point group data corresponding to the object in the image is plotted in the user coordinate system, and the welding robot virtually placed in the user coordinate system performs the welding operation, while avoiding the interference with the point group data. As a result, irrespective of a state in which the object to be welded is disposed or a situation of an obstacle, it is possible to allow the welding robot to perform the welding operation, while avoiding the interference. Therefore, the welding program production system according to the embodiment allows flexible handling of various layout patterns and layout elements.

Note that the present invention is not limited to the embodiment described above, and can variously be carried out in various other forms within the scope not departing from the gist of the present invention. Therefore, the embodiment described above is to be construed in all respects only as illustrative and not restrictive.

For example, in the embodiment described above, the description has been given using the welding robot, but the present invention is not limited thereto. The present invention is applicable to industrial robots including, e.g., a handling robot that performs picking or the like. In this case, the welding programs, the object to be welded, the welding lines, and the welding operation which are used in the embodiment described above can respectively be replaced with work programs, an object to be worked, a portion to be worked, and work.

Figure 10:
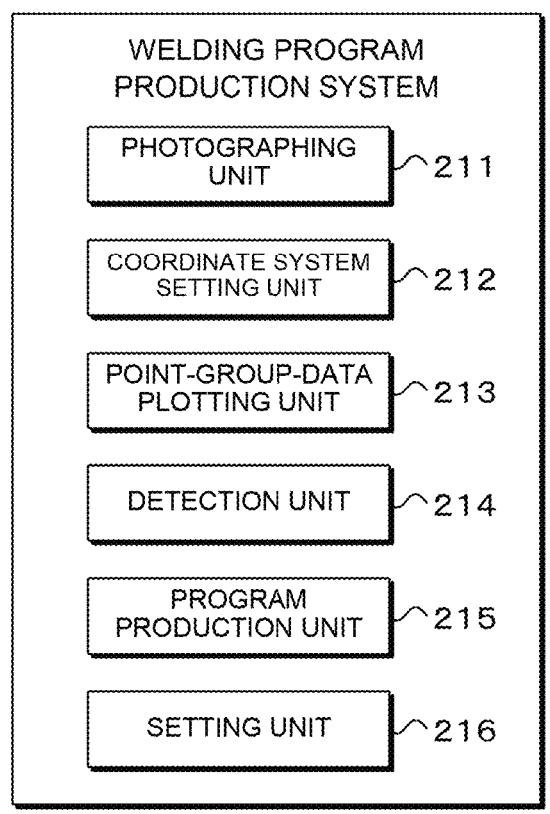
FIG. 10 is a diagram illustrating an example of a functional configuration of a welding program production system according to a modification.

Additionally, in the embodiment described above, it is arranged to avoid the interference with the point group data. However, it may also be possible to set a set of point group data interference with which is not to be avoided, and remove the set of the point group data from a target of interference avoidance. In this modification, as illustrated in FIG. 10, the welding program production system preferably further includes a setting unit 216. For example, the setting unit 216 receives a specification of a range over the point group data displayed in overlapping relation on the image of the object to be welded, and sets the point group data present within the specified range as the set of the point group data to be removed from the target of interference avoidance. As a result, it is possible to allow the work to proceed without performing an avoiding operation with respect to interference which does not interrupt the work, and thus increase the work efficiency.

As the set of the point group data to be removed from the target of interference avoidance, e.g., regions in the vicinity of the welding lines which include the welding lines, regions to be gripped by the handling robot, and the like can be set.

In the embodiment described above, the image including the object to be welded is photographed by the single photographing terminal 1, but it may also be possible to use a plurality of the photographing terminals 1 to photograph images each including the object to be welded from different positions. Thus, the presence or absence of interference is determined for each of the positions at which the photographing was performed and, when it is determined that there is interference, an adjustment can be made so as to avoid the interference. Therefore, it is possible to increase the accuracy of interference avoidance.

What is claimed is:

1. A work program production system comprising:
a photographing terminal that photographs an image including an object to be worked;
a coordinate system setting unit that sets a user coordinate system based on a marker included in the image photographed by the photographing terminal;
a point-group-data plotting unit that detects a specific position of the marker on the basis of the image, sets the detected specific position on point group data acquired by a distance measurement sensor that measures a distance to the object to be worked, and plots, in the user coordinate system, the point group data to which coordinates in the user coordinate system using the set specific position as an origin are given; and
a program production unit that produces a work program so as to allow an industrial robot virtually placed in the user coordinate system to perform work on the basis of the point group data plotted in the user coordinate system, while avoiding interference with the point group data.

2. The work program production system according to claim 1, wherein, when determining that the industrial robot interferes with the point group data, the program production unit assumes that, of areas formed on both sides of the point group data determined to interfere with the industrial robot and serving as a boundary, the area on a side on which the photographing terminal is present is an interference avoidance area, and changes a part of an operation trajectory of the industrial robot in the interference avoidance area to allow the industrial robot to avoid the interference with the point group data determined to interfere with the industrial robot.

3. The work program production system according to claim 2, wherein a direction which allows the industrial robot to avoid the point group data determined to interfere with the industrial robot is a direction which brings the industrial robot further away from the point group data determined to interfere with the industrial robot and closer to the photographing terminal in the interference avoidance area.

4. The work program production system according to claim 1, further comprising:
   a detection unit that detects a portion to be worked of the object to be worked on the basis of the point group data plotted in the user coordinate system, wherein
   the program production unit produces a work program so as to allow the industrial robot to perform the work on the portion to be worked that is detected by the detection unit, while avoiding the interference with the point group data.

5. The work program production system according to claim 1, wherein the photographing terminal is provided in plurality, and the individual photographing terminals photograph images from different positions.

6. The work program production system according to claim 1, further comprising:
   a setting unit that sets a set of the point group data to be removed from a target of interference avoidance.

7. A work program production method to be implemented by a processor, the method comprising the steps of:
   setting a user coordinate system based on a marker included in an image including an object to be worked and photographed by a photographing terminal;
   detecting a specific position of the marker on the basis of the image, setting the detected specific position on point group data acquired by a distance measurement sensor that measures a distance to the object to be worked, and plotting, in the user coordinate system, the point group data to which coordinates in the user coordinate system using the set specific position as an origin are given; and
   producing a work program so as to allow an industrial robot virtually placed in the user coordinate system to perform work on the basis of the point group data plotted in the user coordinate system, while avoiding interference with the point group data.

8. The work program production system according to claim 1, wherein
   the photographing terminal includes a first sensor that photographs the image, wherein
   the distance measurement sensor includes a second image sensor that measures the distance to the object to be worked, and wherein
   the second image sensor is different from the first image sensor.

9. The work program production method according to claim 7, further comprising:
   photographing, by the photographing terminal having a first image sensor, an image including the object to be worked; and
   measuring, by the distance measurement sensor having a second image sensor that is different from the first image sensor, the distance to the object to be worked.

10. The work program production system according to claim 1, wherein
    the distance measurement sensor is included in the photographing terminal.

11. The work program production system according to claim 1, wherein
    the distance measurement sensor is provided separate from the photographing terminal.

* * * * *